United States Patent
Von Elm et al.

(10) Patent No.: US 9,429,777 B2
(45) Date of Patent: Aug. 30, 2016

(54) ELECTRO-OPTIC MODULATOR

(71) Applicant: Coherent LaserSystems GmbH & Co. KG, Göttingen (DE)

(72) Inventors: Rüdiger Von Elm, Wielen (DE); Wolf Seelert, Lübeck (DE)

(73) Assignee: Coherent LaserSystems GmbH & Co. KG, Göttingen (DE)

( * ) Notice: Subject to any disclaimer, the term of this patent is extended or adjusted under 35 U.S.C. 154(b) by 5 days.

(21) Appl. No.: 14/466,147

(22) Filed: Aug. 22, 2014

(65) Prior Publication Data

US 2016/0054597 A1    Feb. 25, 2016

(51) Int. Cl.
*G02F 1/03* (2006.01)
*G02F 1/01* (2006.01)
*G02F 1/00* (2006.01)

(52) U.S. Cl.
CPC ............ *G02F 1/0311* (2013.01); *G02F 1/0018* (2013.01); *G02F 1/0136* (2013.01)

(58) Field of Classification Search
CPC ...... G02F 1/03; G02F 1/0305; G02F 1/0311; G02F 1/0136; G02F 1/0018
USPC ....... 359/245, 257, 246, 247, 251, 252, 256; 372/9, 10, 12, 20
See application file for complete search history.

(56) References Cited

U.S. PATENT DOCUMENTS

| | | | |
|---|---|---|---|
| 7,760,772 B2 | 7/2010 | Wang et al. | |
| 8,089,679 B2 | 1/2012 | Zadoyan et al. | |
| 8,599,487 B2 | 12/2013 | Von Elm et al. | |
| 2006/0153254 A1* | 7/2006 | Franjic | B23K 26/0635 372/30 |
| 2010/0321765 A1* | 12/2010 | Caprara | H01S 3/0823 359/328 |

* cited by examiner

*Primary Examiner* — Tuyen Tra
(74) *Attorney, Agent, or Firm* — Morrison & Foerster LLP

(57) ABSTRACT

An electro-optic modulator for a laser beam includes an yttrium vanadate crystal cooperative with a double-pass electro-optic switch. A beam to be modulated passes through the yttrium vanadate crystal and makes a forward and a reverse pass through the electro-optic switch. The electro-optic switch returns the beam to the vanadate crystal selectively in one of two polarization orientations at 90 degrees to each other. Depending on the polarization orientation, the returned beam is transmitted by the crystal along a corresponding one of two about-parallel paths spaced apart from each other.

14 Claims, 3 Drawing Sheets

ELECTRO-OPTIC MODULATOR

TECHNICAL FIELD OF THE INVENTION

The present invention relates in general to electro-optic optical modulators for modulating laser beams. The invention relates in particular to electro-optic modulators which employ a Pockels-effect switching-element.

DISCUSSION OF BACKGROUND ART

Two basic types of optical modulators are commonly used for modulating laser beams in laser applications. One basic type is known as an acousto-optic (AO) modulator. An AO modulator employs as a switching element a crystal having a pressure-sensitive refractive index, i.e., a piezoelectric crystal. Crystal-quartz is favored for most visible and near infrared (NIR) applications. A radio frequency (RF) voltage is applied to one face of the crystal, typically cooperative with an acoustic absorber on an opposite face. The applied RF voltage causes a sound-wave of corresponding frequency to traverse the crystal. This sound-wave induces a periodic variation of refractive index along the wave-direction. This periodic index variation acts as a diffraction grating. This grating diffracts a portion of an input-beam traversing the crystal (perpendicular to the sound wave direction) as an output-beam away from the main-beam direction to whatever application requires a modulated beam. Alternatively, the input-beam may be introduce in the first order direction of the grating and diffracted into the zero order. This is the more efficient mode.

A particular problem with such an AO-modulator is that transmission efficiency into the output-beam is usually less than about 90%. There can also be a switching-speed limited imposed by the time required for the sound wave to traverse the crystal. This can limit switching rates to tens of kilohertz (kHz) or less.

The other basic modular type is known as an electro-optic (EO) modulator. An EO-modulator employs as a switching-element a birefringent crystal, the birefringence of which can be varied by the application of a high voltage (one kilovolt or more), a property known as the linear electro-optic effect or "Pockels effect," after the discoverer. The crystal is typically used in conjunction with polarization-selective beam-splitters which reflect or transmit an incident beam according to the polarization state (orientation) of the incident beam. The polarization-orientation (determined by the polarizer) of a beam to be modulated is switched through 90° by applying sufficient voltage to the crystal. The beam will be transmitted or reflected by the crystal according to the orientation of the crystal with respect to the beam. Switching speeds of tens of nanoseconds, are possible, depending on voltage-driver and crystal configuration.

One shortcoming of this type of modulator is that polarization-selective beam-splitters have less than 100% efficiency for separating 90°-opposed polarization states. Two-types of polarization-sensitive beam-splitter are typically used. One type is a cemented bi-prism with a reflective multilayer coating at the cemented interface. The materials of the prism and coating layers are selected to have the same refractive index for light polarized in the plane of incidence of the interface. This referred to as p-polarized light by practitioners of the art.

While in theory this should permit 100 percent transmission through the interface, it is rarely achieved consistently in practice. This is because the cemented prisms have residual stress birefringence imposed in manufacturing. This residual birefringence slightly rotates the polarization orientation of light at the interface, which causes transmitted and reflected beams to have the polarization orientation thereof made slightly elliptical.

A second type of polarization-sensitive beam-splitter is known to practitioners of the art as a front-surface polarizer. This splitter has a polarization-selective multilayer coating applied to one surface of a relatively-thin substrate and is typically used at close the Brewster angle to an incident beam. This minimizes effects of residual birefringence in the substrate, and avoids the use of cement which can be a problem in high power applications. The coatings, however, have only a relatively narrow wavelength range of polarization separation and transmission and it is doubtful that greater than 99% transmission of p-polarized radiation could be routinely achieved. Accordingly with either type of beam-splitter, it is doubtful whether a polarization purity (extinction ratio) less than $1 \times 10^{-2}$ for a modulated beam can be routinely achieved.

In certain applications, in particular laser-illuminated confocal microscopy with line blanking, an extinction ratio on the order of at least $1 \times 10^{-3}$, and preferably on the order of $1 \times 10^{-5}$ is desirable. There is a need for an EO-modulator that can achieve such extinction ratios, without sacrifice of switching speed.

SUMMARY OF THE INVENTION

The present invention is directed to E-O modulator apparatus for a laser-beam. The laser beam is plane polarized in a first polarization-orientation. In one aspect the apparatus comprises a first birefringent crystal configured and arranged to receive the laser-beam and transmit the laser-beam along a first path dependent on the first polarization-orientation. A double-pass electro-optic switch including at least a second birefringent crystal cooperative with an end-minor is configured and arranged to receive the laser-beam polarized in the first-polarization orientation from the first birefringent crystal and return the laser-beam to the first birefringent crystal selectively plane-polarized in either the first polarization-orientation or in a second polarization-orientation at ninety-degrees to the first polarization. The electro-optic switch and the first birefringent crystal are further configured and arranged such that if the laser-beam is returned to the first birefringent crystal in the first polarization-orientation the laser-beam is transmitted by the first birefringent crystal on a second path about, but not exactly, collinear with the first path. If the laser beam is returned to the crystal in the second polarization-orientation the laser-beam is transmitted by the first birefringent crystal along a third path laterally displaced from the first and second paths.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
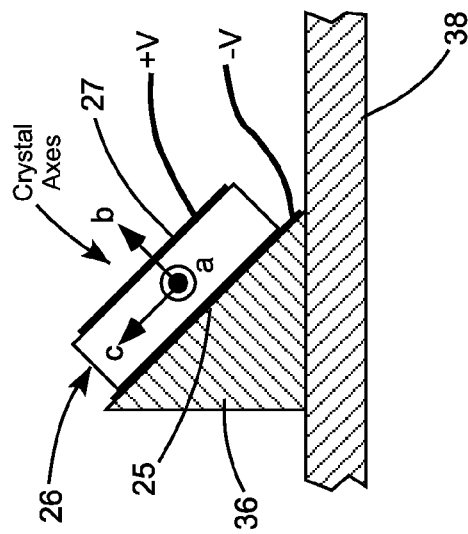
FIG. 1A is a cross-section view seen generally in the direction 1A-1A of FIG. 1, schematically illustrating details of the crystal-axis arrangement, mounting arrangement, and voltage-application arrangement for the RTP crystal of FIG. 1.
Figure 1:
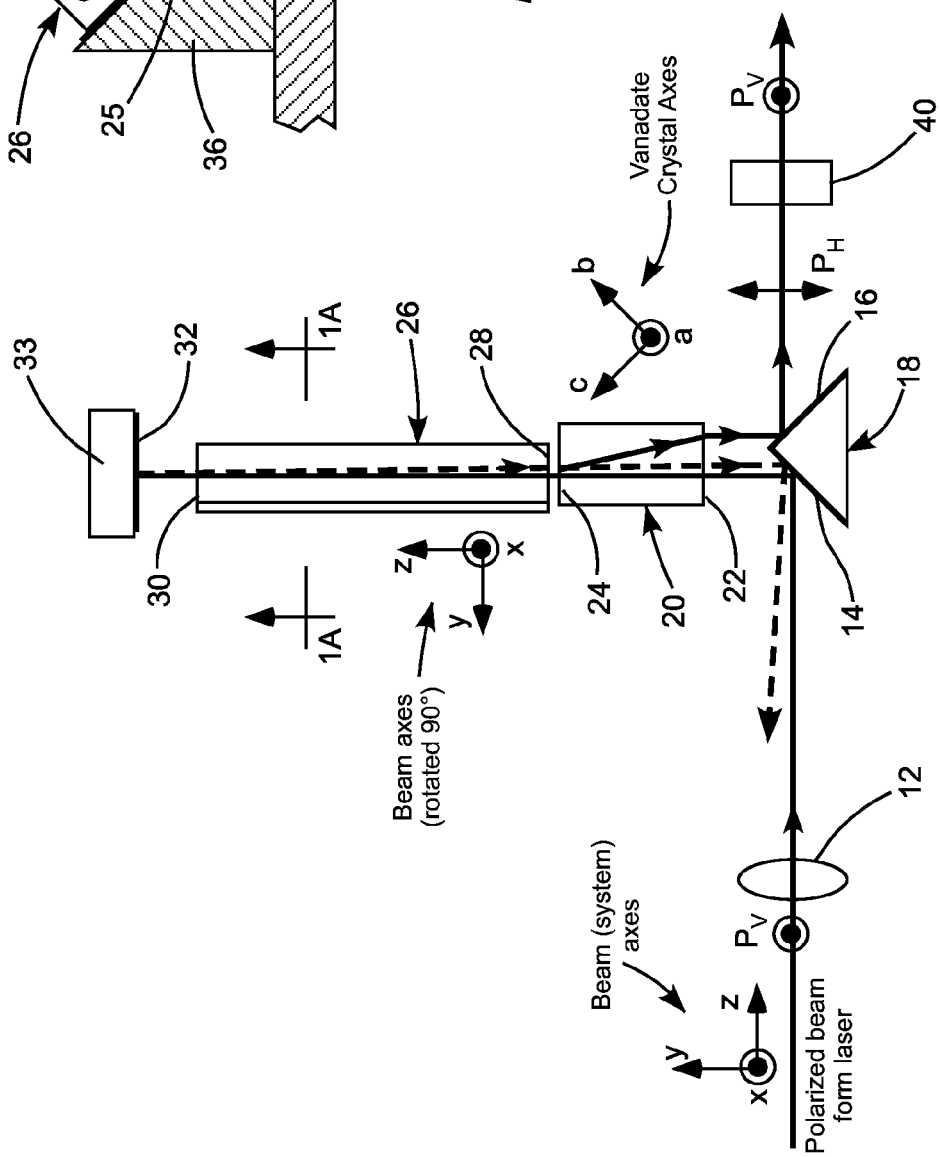
FIG. 1 schematically illustrates one preferred embodiment of an EO-modulator in accordance with the present invention, including an elongated crystal of rubidium titanyl phosphate (RTP) serving as a voltage-switchable polarization rotator, a crystal of undoped yttrium vanadate (YVO$_4$) serving as a spatial polarization-separator, an end-mirror, a directing-mirror, and a collecting-minor, the directing minor directing a beam to be modulated through the YVO$_4$ crystal through the RTP crystal in a forward pass, to be reflected by the end mirror back through the RTP crystal and the YVO$_4$ crystal in a reverse pass, with the reverse pass beam incident on the directing mirror or the collecting mirror depending on the switching state of the RTP crystal.

Referring now to the drawings, wherein like components are designated by like reference numerals, FIG. 1 schematically illustrates one preferred embodiment 10 of an EO-modulator in accordance with the present invention. Essential components of the modulator include a directing minor 14 and a collecting mirror 16, in this instance being reflective coatings on isosceles surfaces of a 90/45/45 prism 18. This arrangement facilitates maintaining alignment of the mirrors with each other, enables the mirrors to be in close proximity, and facilitates mounting on the minors on a base plate (not shown in FIG. 1).

Other essential components include a crystal 20 of un-doped yttrium vanadate (YVO$_4$) having opposite end-faces 22 and 24. YVO$_4$ is a strongly birefringent crystal ($\Delta n \approx 0.21$ at a wavelength of about 1064 nm). Crystal 20 is cut such that an ordinary ray, here, plane-polarized perpendicular to the plane of the drawing ($P_v$), is transmitted directly through the crystal, and an extraordinary ray, plane-polarized at 90° to the ordinary ray in the plane of the drawing ($P_H$) is transmitted through the crystal at angle to the ordinary ray. As depicted in FIG. 1 the a-axis of crystal 20 is perpendicular to the plane of the drawing, with the c-axis (optic axis) at 45° to the direction of propagation of the ordinary ray. The refractive index in the a- and b-axes is the same. The crystal is preferably in the form of a rectangular block, also as depicted.

Continuing with reference to FIG. 1, and with reference in addition to FIG. 1A, crystal 20 is cooperative with a crystal 26, preferably of rubidium titanyl phosphate (RTP). Crystal RTP is a strongly birefringent crystal with a high linear-electro-optic coefficient (Pockels effect). Crystal 26 has opposite end-faces 28 and 30 and opposite side-faces 25 and 27 (see FIG. 1A). An end-mirror 32 (here, a multilayer thin-film coating) deposited on a substrate 33 is positioned adjacent end-face 30 of crystal 26. Optionally, minor coating 32 may be deposited on end-face 30 of crystal 26.

Crystal 26, here, is bonded to a 45° prism 36 supported on a base-plate 38. This provides the required 45 orientation of the c-axis and b-axis relative to the ordinary and extraordinary polarization-orientations. Side-faces 25 and 27 are metallized (plated) providing electrodes to permit application of driving voltage (V), here, designated as +V and −V on the opposite side-faces. A preferred driver for applying the voltages in this manner is a bridge-amplifier including two low voltage amplifier chips, one for each electrode. One suitable such amplifier chip for this purpose is type AD811 available from Analog Devices Inc., of Norwood, Mass.

Now considering the operation of modulator 10, a plane-polarized beam (indicated by a bold solid line) from a laser (not shown) is collimated, if necessary by a positive lens 12 and intercepted by directing mirror 14. The beam has a propagation-axis z and transverse axes x and y, mutually perpendicular. The polarization orientation is indicated in FIG. 1 by arrows $P_v$. Mirror 14 directs the beam into YVO$_4$ (polarizer/analyzer) crystal 20, through face 22 thereof, along in the ordinary ray direction. The beam leaves face 24 of crystal 20 and enters face 28 of crystal 26. The beam traverses the crystal 26 with the propagation-axis z of the beam nominally aligned with the a-axis of crystal 26. The beam leaves crystal 26 via face 30 thereof is incident on end-minor 32 which directs the beam back through crystal 26.

The redirected beam follows a reverse path (indicated by a bold dashed line) path through crystal 26 very close to the forward path but at a slight misalignment angle in the beam y-axis direction to the forward path, for example, less than about 8 milliradians (mrad). This angle can be introduced by suitable cutting of crystal faces 28 or 30 or by a slight deviation from normal incidence of the beam on end-mirror 32. Reasons for minimizing this misalignment angle are discussed further herein below.

With the modulator in an OFF state, i.e., with no net polarization-rotation introduced by the double pass through crystal 26, the reverse-pass beam is still in the ordinary polarization-orientation on exiting face 28 of the crystal, and returns through YVO$_4$ crystal 20 to be incident on directing mirror 14. Minor 14 reflects the beam away from the input path at twice the misalignment (deviation) angle. The deviation angle must be just sufficient to prevent the reverse pass beam from being fed back into the laser without introducing significant depolarization of the beam due to the misalignment of the beam with the a-axis of crystal 26. Such depolarization and misalignment tolerances are discussed in detail further herein below.

With the modulator in an ON state, i.e., with 90° net polarization rotation introduced by the double-pass through crystal 26, the reverse-pass beam is in the extraordinary polarization-orientation on exiting face 28 of the crystal and follows an angled path through YVO$_4$ crystal 20 as indicated in FIG. 1 by a bold, solid line. On exiting face 22 of crystal 20, the beam follows a path about parallel to the input-beam path but spaced apart therefrom in the y-axis direction of the beam. This beam is intercepted by collecting-mirror 16, and directed towards an application location where the beam is used. In a practical example of crystal 20 having a length of about 5.0 millimeters, the y-axis separation of the input and output-beams is about 500 micrometers (μm). The beam diameters are about 200 μm. This makes the prism-face arrangement of minors 14 and 16 particularly advantageous.

It should be noted that the polarization-orientation for the output-beam (indicated in FIG. 1 by arrows $P_H$) is at 90° to that of the input-beam. Optionally, the output-beam orientation can be restored to the input-beam orientation ($P_v$) by a half-wave plate 40.

In modulator 10, if there is any extraordinary component in the input-beam, that component will be completely separated out of the beam by refraction along an angled path, and can bypass crystal 26 out of the modulator. The primary determination of the extinction coefficient of the inventive EO-modulator will be any depolarization introduced by crystal 26 as a result of misalignment, intentional or incidental, of the input-beam with the a-axis of the crystal.

Specifically, any misalignment of the beam in the c-axis direction with the a-axis will create a parasitic extraordinary beam (not shown) which will be displaced, through walk-off from the ordinary beam direction, by a distance Δc from the ordinary beam at end-face 30 of crystal 26 in the c-axis direction of the crystal. This will be a small fraction of the beam-diameter. Any misalignment in the b-axis direction will create an extraordinary beam displacement Δb in the b-axis direction, but this will be much smaller per unit misalignment than Δc, and can be ignored in calculation of an extinction ratio effect.

Figure 2A:
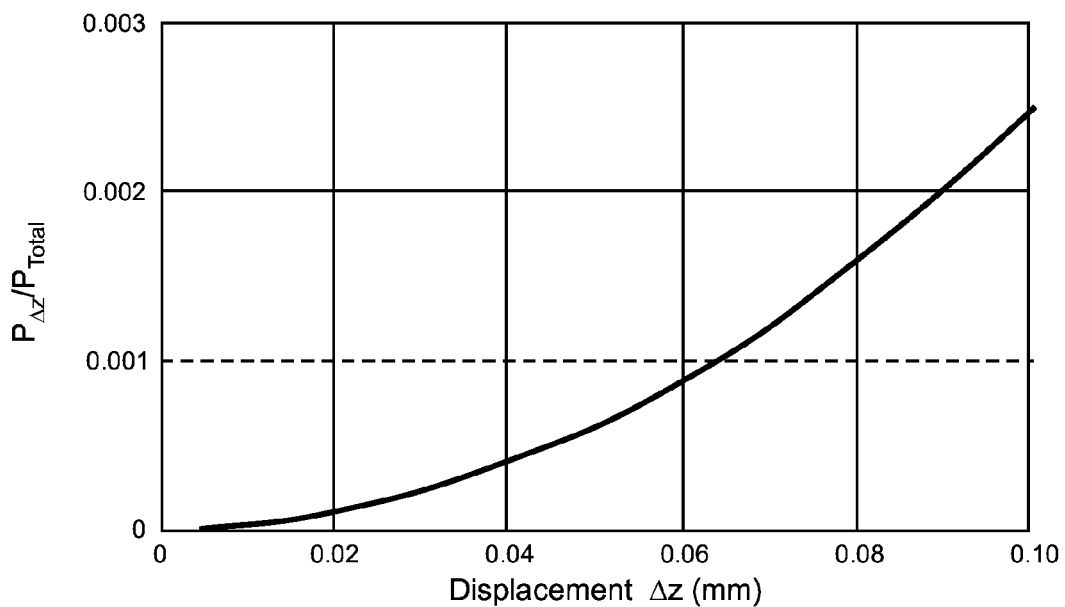
FIG. 2A is a graph of calculated power-fraction in a parasitic extraordinary beam as a function of displacement from an ordinary beam at an end-face of the RTP crystal of FIG. 1, for displacements from 0 to 0.1 mm.

FIG. 2A is a graph of a calculated fraction of total power of the parasitic extraordinary beam as a function of displacement Δc at end-face 30 of crystal 26 for values of Δc from zero to 0.1 mm. It is assumed in the calculation that the crystal has a length of 20 mm and that the beam radius is 500 micrometers. A displacement of about 0.064 millimeters would correspond to an extinction ratio of $1\times10^{-3}$. This would be the fraction of input power that would leak along the modulator output path when the modulator was in an OFF state. The 0.064 mm displacement corresponds to a walk-off angle between the ordinary beam and the parasitic extraordinary beam of 1.6 mrad. This corresponds in turn to a misalignment tolerance of about 16 mrad in the crystal c-axis direction and 258 mrad in the a-axis or b-axis direction, which tolerances are readily feasible.

Figure 2B:
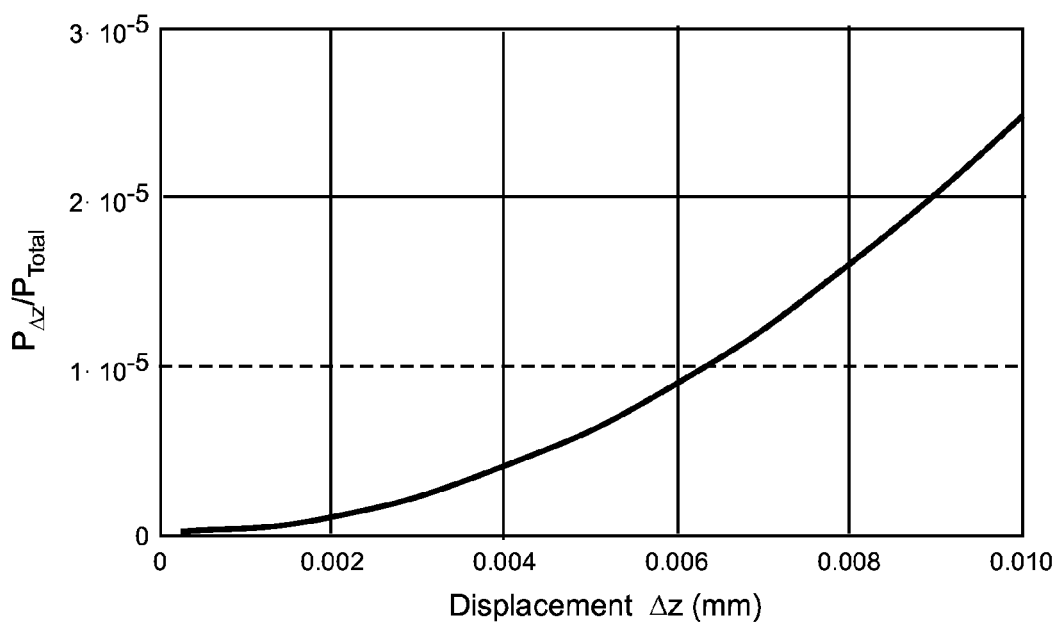
FIG. 2B is a graph of calculated power-fraction in a parasitic extraordinary beam as a function of displacement from an ordinary beam at an end-face of the RTP crystal of FIG. 1, for displacements from 0 to 0.01 mm.

FIG. 2B is a graph of a calculated fraction of total power of the parasitic extraordinary beam as a function of displacement Δc at end-face 30 of crystal 26 for values of Δc from zero to 0.01 mm. It is assumed in the calculation that the crystal has a length of 12 mm and the beam radius is 100 micrometers. A displacement of about 0.0064 millimeters would correspond to an extinction ratio of $1\times10^{-5}$. The 0.0064 mm displacement corresponds to a walk-off angle between the ordinary beam and the parasitic extraordinary beam of 0.053 mrad. This corresponds in turn to a misalignment tolerance of about 0.53 mrad in the crystal c-axis direction and 8.62 mrad in the a-axis or b-axis direction. These tolerances are somewhat critical, but still achievable at additional effort and cost compared with the tolerances for a $1\times10^{-3}$ extinction coefficient.

Figure 3:
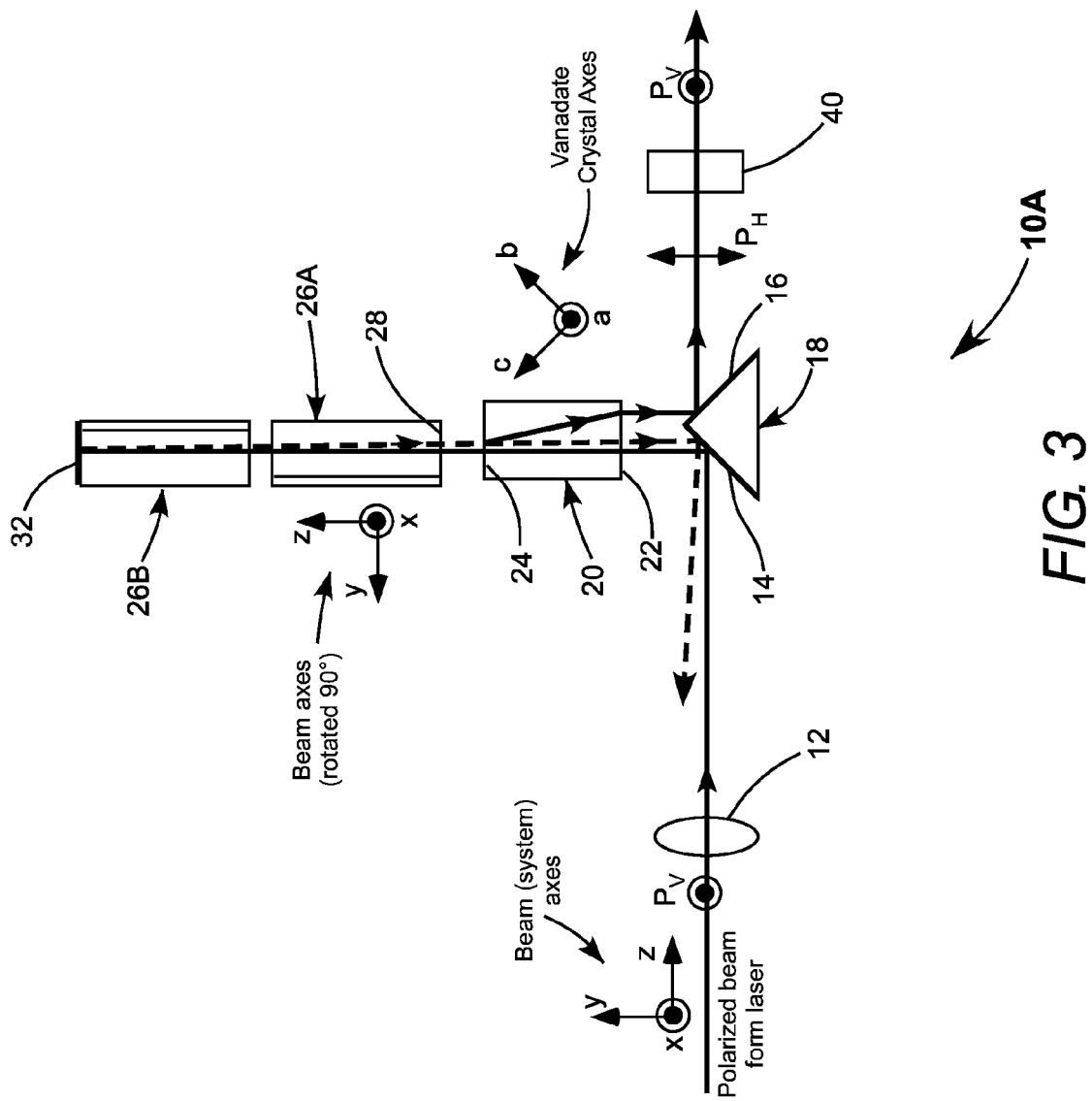
FIG. 3 schematically illustrates another preferred embodiment of an EO-modulator in accordance with the present invention, similar to the embodiment of FIG. 1 but wherein the RTP crystal is replaced by two RTP crystals with corresponding transverse crystal axes at 90 degrees to each other to compensate for static and thermally induced birefringence.

FIG. 3 schematically illustrates another preferred embodiment 10A of an EO-modulator in accordance with the present invention. Modulator 10A is similar to modulator 10 of FIG. 1 with an exception that RTP crystal 26 thereof is replaced in modulator 10A by two RTP crystals 26A and 26B with corresponding transverse crystal axes at 90 degrees to each other to compensate for static and thermally induced birefringence. This arrangement is convenient for laser beams of relatively high spectral bandwidth as the narrow free spectral range of a single crystal is effectively increased. The arrangement is only effective, however, when the crystals have precisely the same length for spectrally aligning transmission bands of each crystal, considered as a Lyot filter. This adds significantly to manufacturing cost. Nevertheless, the arrangement is extensively used in Pockels Cell EO-switches, and is described in detail in several publications, including U.S. Pat. No. 8,089,679 the complete disclosure of which is hereby incorporated herein by reference. Matched, axis-crossed, RTP crystal pairs are commercially available, mounted in temperature controlled enclosures, for example, from Leysop Ltd, of Basildon, UK. Other birefringence-correction arrangements may be used without departing from the spirit and scope of the present invention.

In summary the present invention is described above with reference to preferred embodiments. The invention, however, is not limited to the embodiments described and depicted herein. Rather, the invention is limited only by claims appended hereto.

What is claimed is:

1. Electro-optic modulator apparatus for modulating a laser-beam plane-polarized in a first polarization-orientation, the apparatus comprising:
    a first birefringent crystal configured and arranged to receive the laser-beam and transmit the laser-beam along a first path dependent on the first polarization-orientation;
    a double-pass electro-optic switch including at least a second birefringent crystal cooperative with an end-mirror, and configured and arranged to receive the laser-beam polarized in the first-polarization orientation from the first birefringent crystal and return the laser-beam to the first birefringent crystal selectively plane-polarized in either the first polarization-orientation when the second birefringent crystal is inactive or in a second polarization-orientation at ninety-degrees to the first polarization when the second birefringent crystal is activated, and
    wherein the electro-optic switch and the first birefringent crystal are further configured and arranged such that if the laser-beam is returned to the first birefringent crystal in the first polarization-orientation, the laser-beam is transmitted by the first birefringent crystal on a second path displaced from the first path by a first amount, and if the laser beam is returned to the first birefringent crystal in the second polarization-orientation, the laser-beam is transmitted by the first birefringent crystal along a third path laterally displaced from the first path by a second amount, with the second amount being larger than the first amount.

2. The apparatus of claim 1, wherein the second path is inclined at an angle of about 8milliradians to the first path.

3. The apparatus of claim 1, wherein the first birefringent crystal is a neodymium vanadate crystal.

4. The apparatus of claim 3, wherein the second birefringent crystal is a rubidium titanyl phosphate crystal.

5. The apparatus of claim 1, further including a prism having first and second mirror coatings on respectively first and second adjacent faces thereof with the first mirror coating arranged to direct the laser-beam from an entrance path into the first birefringent crystal along the first path, and with the second mirror coating arranged to receive the laser-beam transmitted by the first birefringent crystal along the third path and reflect the laser-beam along an exit path.

6. The apparatus of claim 5, further including a polarization rotator located in the exit path and arranged to rotate the polarization- orientation of the laser beam from the second polarization-orientation to the first polarization orientation.

7. The apparatus of claim 1, wherein the electro-optical switch includes the second birefringent crystal and a third birefringent crystal aligned in numerical order along the first beam path, and the end mirror is deposited on an end face of the third birefringent crystal.

8. The apparatus of claim 7, wherein the optic-axes of the second and third birefringent crystals are aligned at ninety degrees to each other.

9. The apparatus of claim 8, wherein the second and third birefringent crystals have the same length.

10. The apparatus of claim 9, wherein second and third birefringent crystals are rubidium titanyl phosphate crystals.

11. The apparatus of claim 1, wherein the fraction of the input power that is transmitted along the third path when the second birefringent crystal is in the inactive state is less than $1 \times 10^{-3}$.

12. A method of operating a modulator for selectively directing a plane polarized input laser beam along an exit path, said modulator including a first and second birefringent crystals, said method comprising:
    directing the laser beam sequentially into the first and second birefringent crystals and then sequentially back through the second and first birefringent crystals, said first and second birefringent crystals being arranged so the beam exiting the first birefringent crystal is displaced from the beam entering the first birefringent crystal by a first amount; and
    activating the second birefringent crystal in a manner to rotate the polarization of the laser beam by ninety degrees such that when the beam passes through the first birefringent crystal the second time, the path of the beam is displaced such that upon exiting the first birefringent crystal, the beam is displaced from the beam entering the first birefringent crystal by a second amount, the second amount being larger than the first amount.

13. A method as recited in claim 12, wherein when the second birefringent crystal is not activated, the fraction of the input power that exits the first birefringent crystal the second time along a path corresponding to the second displacement amount is less than $1 \times 10^{-3}$.

14. A method as recited in claim 12, further including a third birefringent crystal positioned so that the beam exiting the second birefringent crystal the first time enters the third birefringent crystal, and wherein after passing through the third birefringent crystal, the beam passes back through the third birefringent crystal and into the second birefringent crystal, with the optical axis of the third birefringent crystal being perpendicular to the optical axis of the second birefringent crystal.

* * * * *